US007315810B2

(12) United States Patent
Azzam et al.

(10) Patent No.: US 7,315,810 B2
(45) Date of Patent: Jan. 1, 2008

(54) NAMED ENTITY (NE) INTERFACE FOR MULTIPLE CLIENT APPLICATION PROGRAMS

(75) Inventors: Saliha Azzam, Redmond, WA (US); Michael V. Calcagno, Kirkland, WA (US); David N. Weise, Kirkland, WA (US); Kevin R. Powell, Kirkland, WA (US); Sonja S. Knoll, Redmond, WA (US); Pär Jonas Barklund, Kirkland, WA (US); Evelyne Viegas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 10/041,516

(22) Filed: Jan. 7, 2002

(65) Prior Publication Data

US 2003/0130835 A1    Jul. 10, 2003

(51) Int. Cl.
*G06F 17/27*    (2006.01)
(52) U.S. Cl. ........................................................ 704/9
(58) Field of Classification Search ............... 704/9
See application file for complete search history.

(56) References Cited

U.S. PATENT DOCUMENTS

| | | | | |
|---|---|---|---|---|
| 5,721,897 | A * | 2/1998 | Rubinstein ...................... | 707/2 |
| 5,794,050 | A | 8/1998 | Dahlgren et al. ........... | 395/708 |
| 5,873,056 | A | 2/1999 | Liddy et al. ................... | 704/9 |
| 6,052,682 | A | 4/2000 | Miller et al. ................... | 707/3 |
| 6,104,990 | A * | 8/2000 | Chaney et al. ................. | 704/9 |
| 6,311,152 | B1 * | 10/2001 | Bai et al. ........................ | 704/9 |
| 6,446,035 | B1 * | 9/2002 | Grefenstette et al. ......... | 704/1 |
| 6,665,687 | B1 * | 12/2003 | Burke ...................... | 707/104.1 |
| 6,697,801 | B1 * | 2/2004 | Eldredge et al. ............... | 707/6 |
| 2002/0026306 | A1 | 2/2002 | Bangalore et al. | |
| 2002/0076109 | A1 * | 6/2002 | Hertzfeld et al. ........... | 382/229 |
| 2003/0050782 | A1 * | 3/2003 | Zweig et al. ................ | 704/270 |
| 2003/0069880 | A1 * | 4/2003 | Harrison et al. ............... | 707/3 |

OTHER PUBLICATIONS 03000071.5-1527 Jun. 13, 2003, EP—Search Report.
Disambiguation of Underspecified Discourse Representation Structures under Anaphoric Constraints by Michael Schiehlen Report 188, Jan. 1997.
03006251.7 Dec. 13, 2005 EP Search Report.
Michael Gamom et al. "Amalgam: A machine-learned generation module". Jun. 11, 2002. Microsoft Research, Technical Report MSR-TR-2002-57.
Takako Aikawa et al., "Generation for Multilingual MT", Sep. 2001, European Association for Machine Translation Summit VIII, Spain.
B. Lavoie et al., "A fast and portable realizer for text generation systems" 1997.
L. Iordanskaja et al., Generation of extended bilingual statistical reports 1992.
T. Becker et al., "An efficient kernel for multilingual generation in speech-to-speech dialogue translation" 1998.

(Continued)

*Primary Examiner*—David Hudspeth
*Assistant Examiner*—Jakieda Jackson
(74) *Attorney, Agent, or Firm*—Joseph R. Kelly; Westman, Champlin & Kelly, P.A.

(57) ABSTRACT

The present invention is a named entity (NE) interface to a linguistic analysis layer. The interface exposes each input sentence to the NE recognizers of all applications and returns all recognized NEs. Thus, the present invention can accommodate NEs which dynamically change in the applications, because each input string will be handed to the applications for NE recognition. The present invention also includes a data structure which is a normalized form of recognized NEs.

26 Claims, 4 Drawing Sheets

OTHER PUBLICATIONS

D. Beeferman et al. Cyberpunc: A lightweight punctuation annotation system for speech, 1998.

From Discourse to Logic Introduction to Modeltheoretic Semantics of Natural Language, Formal Logic and Discourse Representation Theory. By: Hans Kemp et al. vol. 42, 1993 Relevant Chapters 1 and 2.

03000071.5 Jun. 13, 2003 EP Search Report.

Maynard, D. and Tablan, V. and Ursu, C. and Cunningham, H. and Wilks, Y. (2001) *Named Entity Recognition from Diverse Text Types*.

\* cited by examiner

NAMED ENTITY (NE) INTERFACE FOR MULTIPLE CLIENT APPLICATION PROGRAMS

BACKGROUND OF THE INVENTION

The present invention relates to named entity recognition. More specifically, the present invention relates to a system for recognizing named entities from multiple applications.

A named entity (NE) is a specific linguistic item, such as a proper name, the name of a company, an email address, etc., which is treated as one unit by an application. Named entity recognizers are known, and named entity processing is known to be an important stage of linguistic analysis.

NE recognition is currently done in a number of ways. Some approaches for NE recognition use list lookup when NEs are fixed (or static) such as city names, country names, first names, company names, fixed terms like product names, etc. Other approaches use regular expressions and grammar rules that can combine syntactic information with a lexicon or list lookup in order to recognize NEs. Most common approaches build finite-state recognizers directly from training data.

However, a number of problems currently exist with linguistic analysis systems that attempt to recognize named entities for a variety of applications. Applications constitute specific and specialized domains. Therefore, the named entities to be recognized by each will vary, depending on the application. If a recognizer is to be used with each application, then various recognizers must be taken into account within the same linguistic analysis layer where a textual input string may include named entities from several different applications.

In addition, some applications require the ability to modify their lists of NEs and update NE terms constantly. Some such applications even require the ability to update NE lists between the linguistic analysis of two sentences. Typical examples of such applications include those that maintain a list of names that can be edited by the user regularly. For example, for an application that handles file names (i.e., where file names are NEs), NE lists are updated when files are deleted, renamed or created. A given file name can thus be an NE when processing a first sentence but may not be an NE (if the file has been deleted or renamed) when processing a next subsequent sentence.

SUMMARY OF THE INVENTION

The present invention is a named entity (NE) interface to a linguistic analysis layer. The interface exposes each input sentence to the NE recognizers of all applications and returns all recognized NEs. Thus, the present invention can accommodate NEs that dynamically change in the applications, because each input string is handed to the applications for NE recognition.

Another aspect of the invention includes a merging feature that merges NEs recognized for the same span of the textual input. In this way, different syntactic parse trees need not be created for different NE recognitions for the same span of input tokens.

The present invention also includes a data structure which is a normalized form of recognized NEs. This normalized form is generated by the interface, populated with information provided via the interface by the application, and handed to a linguistic system for further linguistic analysis.

The present invention can also be used with conventional NE recognition systems. Such systems are based on NE grammars or lexicons loaded into the NE processing system by the applications.

DETAILED DESCRIPTION OF ILLUSTRATIVE EMBODIMENTS

The present invention relates to a named entity (NE) processing system and also includes an NE data structure. However, prior to discussing the specifics of the present invention, a discussion of one exemplary environment in which the present invention can be used is appropriate.

Figure 1:
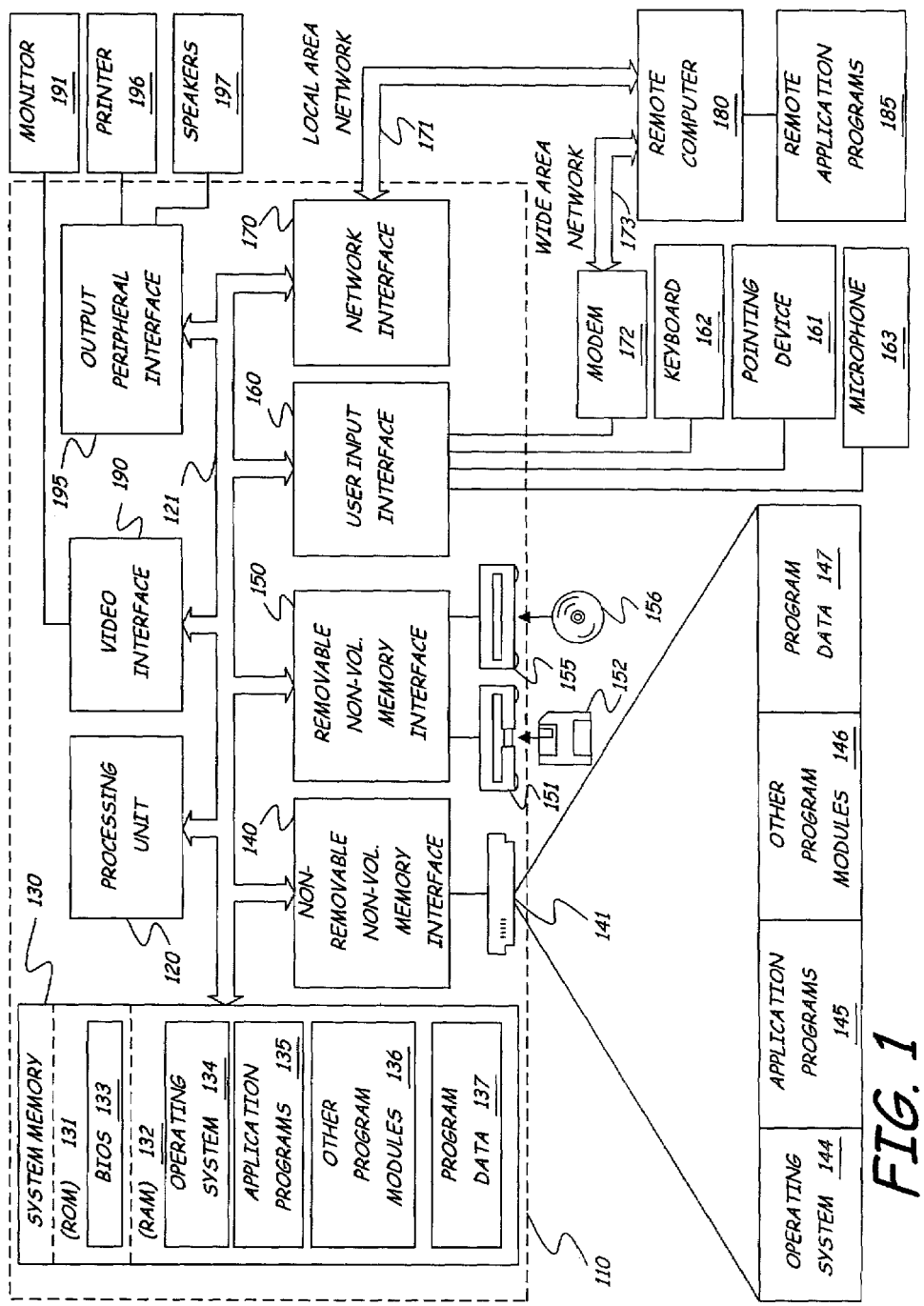
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
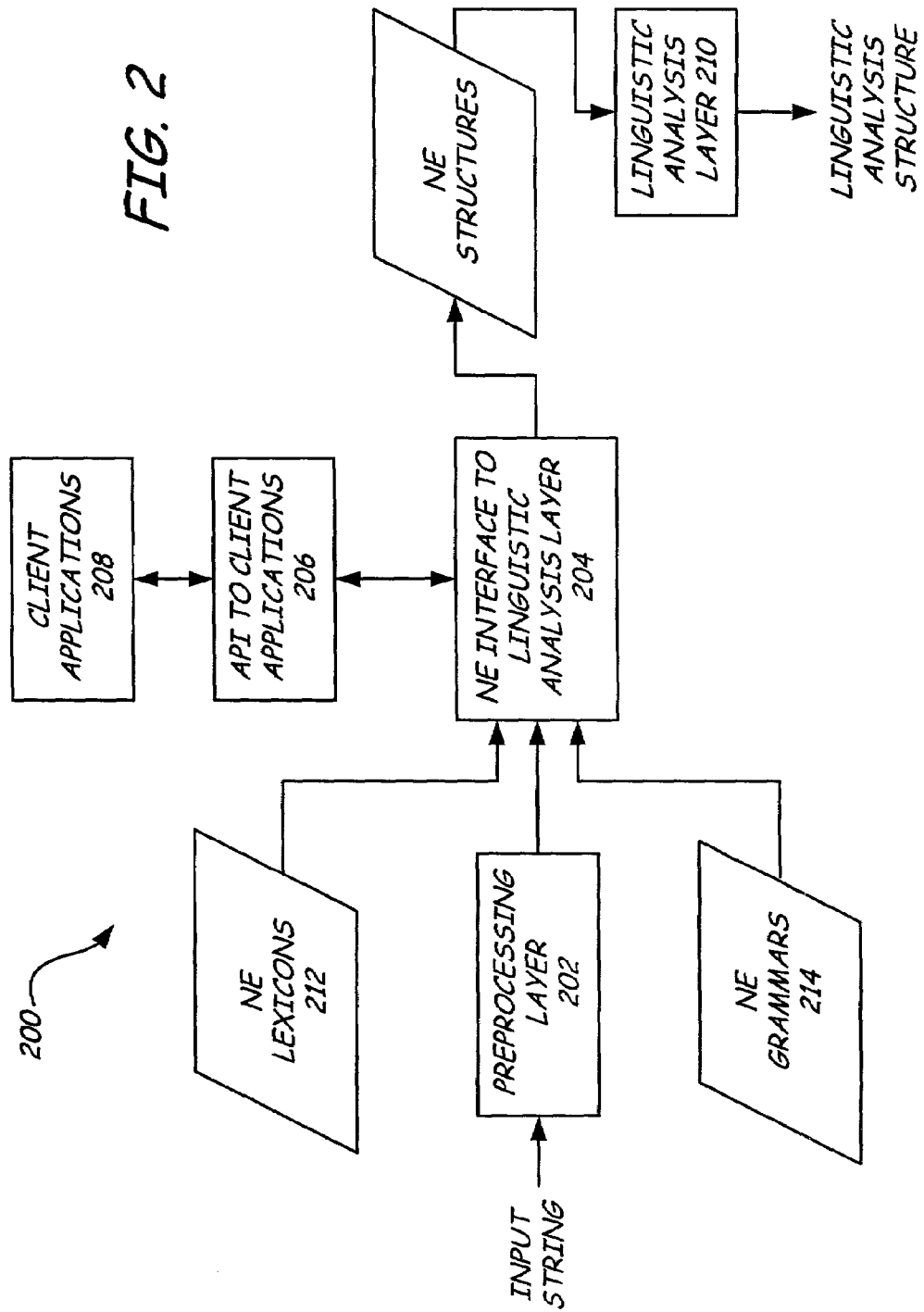
FIG. 2 is a block diagram of an NE processing system in accordance with one embodiment of the present invention.

FIG. 2 is a more detailed block diagram of an NE processing system 200 in accordance with one embodiment of the present invention. It should be noted that various portions of NE processing system 200 can be implemented in the various blocks in FIG. 1. In any case, NE processing system 200 illustratively includes preprocessing layer 202, NE interface to linguistic layer 204, application programming interface (API) to client applications 206, client applications 208, linguistic analysis layer 210, optional NE lexicons 212 and optional NE grammars 214.

In operation, briefly, preprocessing layer 202 illustratively receives a textual input string and performs preprocessing on that input string. Such processing illustratively includes tokenization and morphological processing. For example, preprocessing layer 202 illustratively breaks the input string into its individual tokens and may perform some morphological processing to reduce the tokens to stemmed forms or to obtain lemmas for each of the tokens. Any known tokenization component and morphological component can be used.

The preprocessed input string is then handed to NE interface 204. NE interface 204 passes the preprocessed input string, through API 206, to client applications 208. API 206 exposes methods which, when invoked, pass the input string to the client applications such that they can use their own NE recognizers (if they exist) to recognize NEs in the input string. API 206 also exposes methods which, when invoked, pass the results of all NE recognitions at applications 208 back through API 206 to NE interface 204. NE interface 204 can also obtain additional recognized NEs based on NE lexicons 212 or NE grammars 214.

Once all of the recognized NEs are obtained by interface 204, further processing is performed on those NEs (such as normalization and filtering which are discussed below). The NE structures are passed to a linguistic analysis layer 210 which performs additional linguistic analysis on the input string and the NE structures recognized in the input string.

Figure 3:
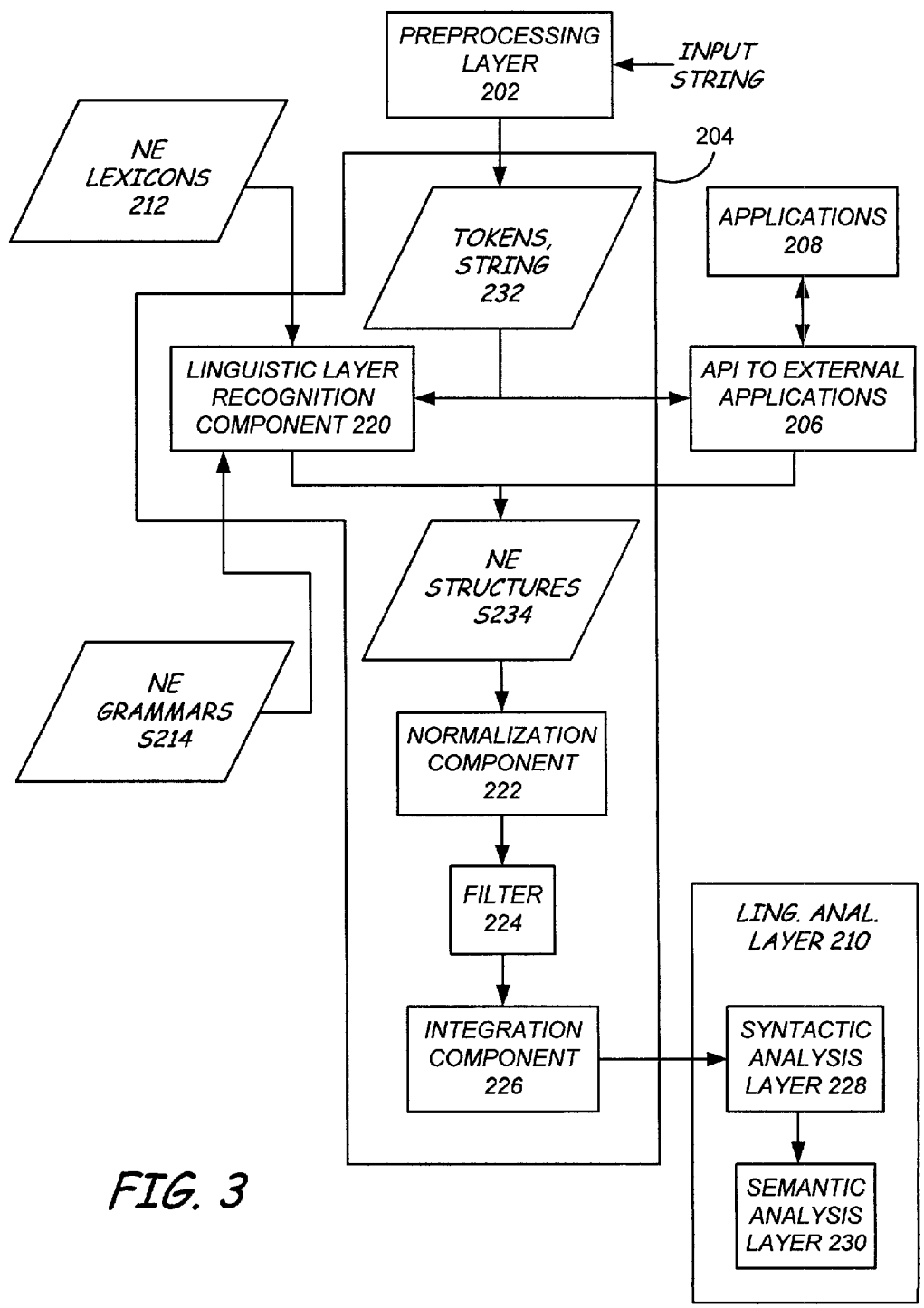
FIG. 3 is a more detailed block diagram of an NE interface to a linguistic layer in accordance with one embodiment of the present invention.

FIG. 3 is a more detailed block diagram of NE interface 204 and linguistic analysis layer 210 in accordance with but one exemplary embodiment of the present invention. A number of items are similar to those shown in FIG. 2 and are similarly numbered. FIG. 3 shows that NE interface 204 illustratively includes a linguistic layer recognition component 220, normalization component 222, filtering component 224 and integration component 226. FIG. 3 also shows that linguistic analysis layer 210 illustratively includes syntactic analysis layer 228 and semantic analysis layer 230.

As discussed with respect to FIG. 1, the input string is preprocessed by preprocessing layer 202 and tokens and the input string 232 are provided to NE interface 204. NE interface 204 makes an API call to API 206. API 206 is based on a call back mechanism that requests the various registered applications 208 for an identification of NEs within the current input string which has been passed to it.

NE interface 204 sends to API 206 the input sentence (e.g., the string and set of tokens). The way the API exchanges data with external recognizers is illustratively flexible enough to allow augmenting this data with some additional information when needed by the NE recognizers in applications 208. For example, some additional information can be needed on individual words that occur within input sentences, in order for application 208 to perform NE recognition. Such information is illustratively made available to NE interface 204 through API 206 prior to the beginning of processing. In that case, NE interface 204 not only passes the string and set of tokens to API 206, but also passes the appropriate set of features specified by applications 208.

The API 206 returns the set of all recognized NEs recognized by registered applications 208. It should be noted, of course, that the same token sequence may have many distinct NE identifier structures, and may even have multiple different NE recognitions within a single application.

In one illustrative embodiment, the tokens and input string 232 are also provided to linguistic layer recognition component 220 in NE interface 204. This allows NE interface 204 to make use of NE grammars 214 and NE lists (or NE lexicons) 212 which may be integrated along with linguistic analysis layer 210. This will likely happen in primarily two instances.

First, NE recognition can be made available by linguistic analysis layer 220 and NE interface 204 as part of a set of general linguistic services that enhance the linguistic analysis. These resources are illustratively directed to general purpose NEs because they are recognized by linguistic analysis recognition component 220, as opposed to very domain specific NEs when they are recognized by applications 208. Applications 208 can then map these generic types to their domain specific semantic types that relate to their domain model. For example, if the generic NE types include person names, location names, and company names, and if all company names that occur in the context of a financial application are "stock symbols" then the application can explicitly specify that the general purpose category "company" maps into the application specific category "stock symbol". This means that all company names recognized by the general purpose NE grammar 214 are interpreted as "stock symbols" within the application.

A second way in which linguistic layer recognition component 220 is used to recognize NEs is when the applications simply defer to NE interface 204 to recognize NEs. In other words, the present invention allows for the option in which applications 208 supply domain specific resources (such as NE grammars 214 or NE lexicons 212) to the linguistic layer recognition component 220. Component 220 thus is explicitly in charge of performing the NE recognition.

It should also be noted, of course, that the present invention provides for either NEs to be recognized by applications 208, or NEs to be recognized by linguistic recognition component 220. Also, however, the present invention allows for some applications 208 to defer to component 220 for NE recognition while allowing other applications 208 to recognize their own NEs. In this case, duplicate NEs must be filtered or merged as is discussed below.

The NE structures are then provided to normalization component 222. Normalization component 222 packages the identified NE structures into a compacted normalized representation that contains information needed by the linguistic analysis layer 210. This allows the NE structures to be processed by interface 204 and layer 210 in the same manner, regardless of the way they were recognized (i.e., through API 206 and applications 208, or recognition component 220) and regardless of the particular application 208 they may belong to. One illustrative embodiment of the data structure which illustrates the normalized form of the NE is as follows:

NE identifier: This identifier is assigned by the application that recognizes the NE and allows the application to access the information it keeps for the NE through this identifier.

NE string: This is the string of the token set of the recognized NE.

Application name or identifier: This is an identifier which is unique within the scope of the system with all registered applications.

Semantic type: This links the domain model of the application to the NE.

Range of the NE: This illustratively specifies which sequence of tokens or characters the NE is covering, and may include an identification of a first token in the recognized NE and a last token in the recognized NE.

NE attributes/properties: This represents the data structure that describes the NE. It can be generally represented by a list of <attribute, value> pairs where the value can either be simple or a list of properties that allow for embedded substructures. This set of attributes is open and allows for flexibility about the type of information that can be passed through the NE to the linguistic analysis layer 210.

Syntactic type: This is the syntactic type of the NE which is usually a noun (unless otherwise specified) and if it is other than a noun, it must be specified by the application.

A number of examples may be helpful.

Consider the Input Token String

The participants were Professor H. Bondi, Professor of Mathematics at Kings College, London and Dr. W. B. Bonnor, Reader in Mathematics at Queen Elizabeth College, London.

For this example, Three different named entity structures are illustrated as follows:

Named Entity Id Number: 1
   NE string: professor H. Bondi
   Application ID: XXX
   Semantic Type: person
   First token: 4
   Last token: 6
   Attributes:
     TITLE: professor
     FIRSTNAME: H.
     LASTNAME: Bondi
   Syntactic Type: NP
Named Entity Id Number: 2
   NE string: Dr. W. B. Bonnor
   Application ID: XXX
   Semantic Type: person
   First token: 18
   Last token: 21
   Attributes:
     TITLE: Dr.
     FIRSTNAME: W.
     LASTNAME: Bonnor
   Syntactic Type: NP
Named Entity Id Number: 3
   NE string: Queen Elizabeth College
   Application ID: XXX
   Semantic Type: place
   First token: 27
   Last token: 29
   Attributes: <none>
   Syntactic Type: NP Once all of the NE structures 234 are obtained by NE interface 204 and normalized, they are passed to filter 224 for merging. Each of the NE structures 234 illustratively includes the span of tokens in string 232 which the NE recognition covers. Different NE recognitions for the exact same token span need not all generate different syntactic parses. The syntactic parser simply needs to know that that particular span of tokens has been recognized as an NE, and it need not know that it has been recognized as more than one possible NE. Therefore, filter 224 filters the NE structures such that only one structure is provided for each specific span of tokens in the input string 232.

Thus, NE structures that cover the same sequence within the input sentence (either from different applications or within the same application) are all merged into one syntactic unit. The syntactic unit contains a reference to the different normalized NE structures the sequence is covering.

Once the NE structures are normalized and merged they are provided to integration component 226. Component 226, exposes and integrates the normalized NE structures into the linguistic analysis layer 210 and may illustratively provide them to syntactic layer 228.

In the syntactic analysis component, the range of recognized NEs within the input sentence (e.g., the sequence of tokens) constitutes a single syntactic unit for syntactic parsing. The syntactic type of the NE is defaulted to a noun phrase, if no specific syntactic type is specified by the recognizers in applications 208.

In making the NE structures available to syntactic analysis layer 228, integration component 226 illustratively creates new syntactic units for input to the parser in syntactic analysis layer 228 for the recognized NEs. The new syntactic unit illustratively includes the sequence of the input sentence covered by the NE, the part of speech of the NE and a pointer to the normalized NE structure the syntactic unit is representing. All the attribute values of the normalized NE structure can therefore be accessed through this pointer by the syntactic parser.

The syntactic analysis output by layer 228 is provided to semantic analysis layer 230 for further semantic analysis. During the semantic analysis, both the application identifiers of the NEs and their semantic types are used to perform a semantic interpretation of the semantic analysis results. The application identifiers form the link to the application domain model. It is used to retrieve more specific information, in addition to the specified semantic type, to enhance the semantic interpretation.

When several NEs cover the same sequence of tokens or overlap at the syntactic layer, several semantic interpretations are produced. For example, consider the phrase "When Harry met Sally" and assume it is both a "filename" in a first application and a "film" name in a second application. NE interface 204 creates a single syntactic unit for both recognized NEs, resulting in a single syntactic parse and two distinct normalized NE structures, accessible from the syntactic unit. However, during semantic analysis, both normalized NE structures are expanded to generate two semantic interpretations. Both interpretations are compared to the domain model of the application 208 which can be accessed through the application identifier that the NE normalized structure links to. Thus, if the sentence containing the above example was "Delete when Harry met Sally."

Possible interpretations could be:
Delete
Object: <FileConcept> in application 1.
or:
Delete
Object: <FilmConcept> in application 2.

In this case, if there is not a "delete action on a film concept" that is appropriate for application 2 (i.e., it is not validated by the domain model for application 2) then the second interpretation will be ruled out or will simply not be produced. Note that even within a single application, some NEs can be assigned several semantic types. For example, in the example sentence "I would like to send an email to Clyde Hill", the term "Clyde Hill" can represent a "person" concept as well as a "location" concept within the same application. However, even though some ambiguity may remain, much of it is reduced by the present invention.

Figure 4:
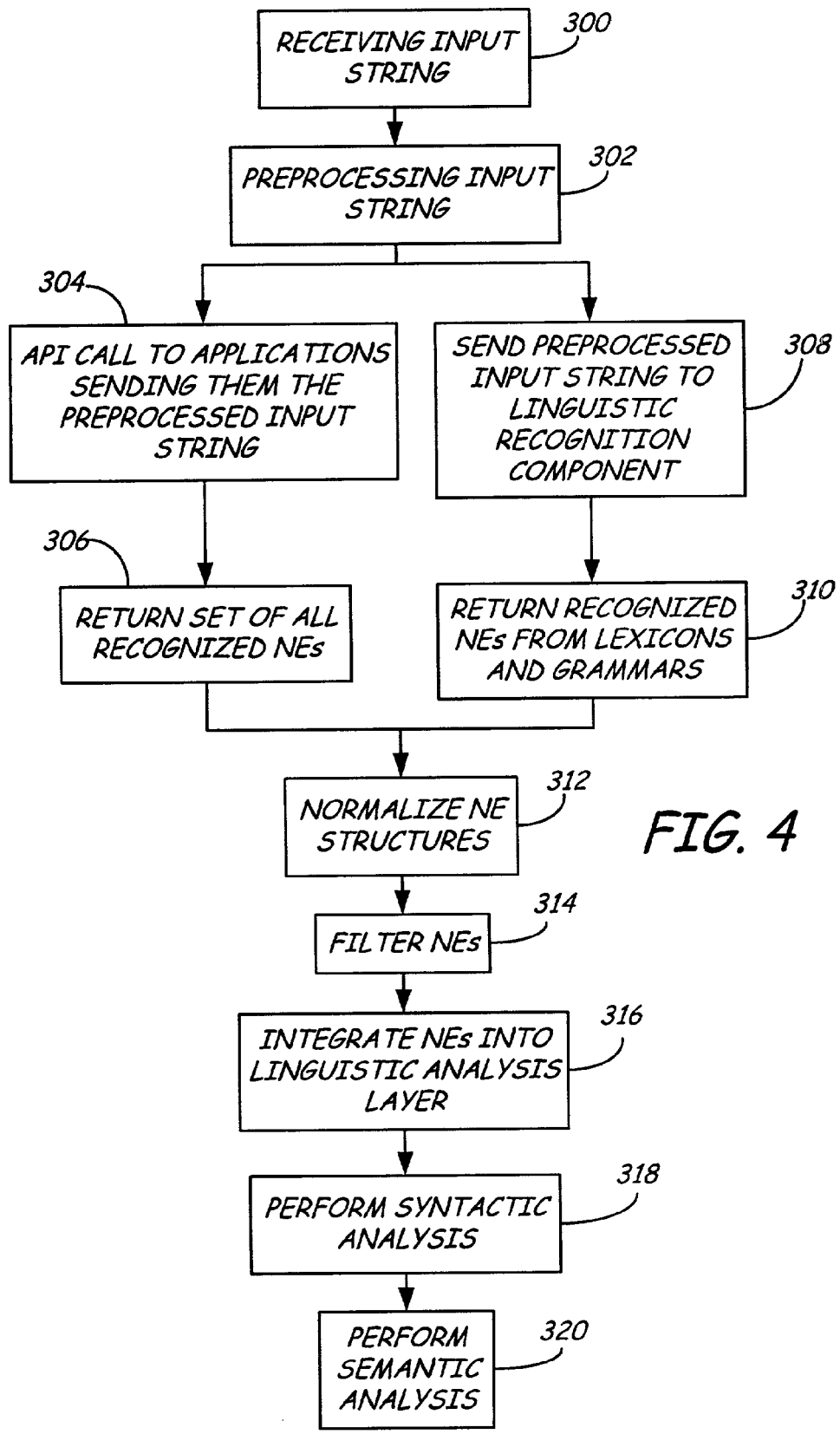
FIG. 4 is a flow diagram illustrating data flow for NE processing in accordance with one embodiment of the present invention.

FIG. 4 is a flow diagram which illustrates operation in accordance with one embodiment of the present invention. First, the input string is received. This is indicated by block 300. Next, the input string is preprocessed as discussed with respect to FIG. 3. This is indicated by block 302.

Then, the API call and the recognition using component 220 can be accomplished in parallel processes as shown in FIG. 4, or they can be accomplished sequentially. In any case, NE interface 204 makes an API call through API 206 to applications 208 sending the applications the preprocessed input string. This is indicated by block 304. API 206 returns all recognized NEs, which are recognized by applications 208. This is indicated by block 306.

At the same time, recognition component 220 also receives the tokens and input strings 232. This is indicated by block 308. Recognition component 220 recognizes NEs based on NE grammars 214 or NE lexicons 212 that it has access to and returns NE structures 234. This is indicated by block 310. The NE structures are then normalized by normalization component 222 as indicated by block 312 and the NEs are filtered by the filtering component 224, or merged as indicated by block 314 such that a single syntactic unit is created for two or more NE structures that cover precisely the same span of input tokens. The NE structures are then integrated into the linguistic analysis layer by integration component 226. This is indicated by block 316. Finally, syntactic and semantic analysis is performed on the input string and NEs as indicated by blocks 318 and 320.

It can thus be seen that the present invention provides a number of significant advantages over the prior systems. For example, since the present invention provides each and every input string to applications 208 (where the applications desire this) the applications can dynamically change their NEs, even from sentence-to-sentence, and those NEs will be recognized appropriately.

Similarly, the present invention deals conveniently with multiple different types of applications. By providing the input strings to the NE recognizer in the applications 208, any different types of applications can use their own NE recognizers to check for NEs. The NE structures created include an application identifier which indicates which application the NEs were recognized in.

Because the application has its own NE recognizer and the NE structures include the necessary information to parse the NE correctly, this information is used to guide parsing of the input sentence. For example, phrases such as "Boeing Airplane Company" and "Stocks to watch" are NEs for some specific types of financial applications. The first NE is a name of a company and the second is a folder name. An example sentence such as "Add Boeing Airplane Co. to stocks to watch" is much less likely to be processed correctly by a general parser with no knowledge of the application domains it is servicing. In accordance with the present invention, however, both of the named entities in that sentence will be recognized by the named entity recognizer in the application 208.

Similarly, when NEs in accordance with the present invention are recognized and integrated into the linguistic analysis, they significantly contribute to narrowing down the context of the input sentence and to thus help reduce ambiguity introduced by the context of multiple applications. Knowing that a given NE in the input sentence was recognized by a given application yields significant evidence to select a domain or application that is the relevant context.

The semantic type assigned to the recognized NEs by the application also greatly contributes to disambiguating the input sentence and constitutes important information for semantic interpretation. The semantic types represent specific concepts of the application's domain model and thus guide semantic analysis to produce appropriate semantic interpretations.

Although the present invention has been described with reference to particular embodiments, workers skilled in the art will recognize that changes may be made in form and detail without departing from the spirit and scope of the invention.

What is claimed is:

1. A method of linguistically analyzing a textual input, comprising:
   receiving a textual representation of the textual input;
   providing the textual representation to an interface that exposes the textual representation to a plurality of application programs;
   receiving from the interface an indication of named entities (NEs) recognized in the provided textual representation by the application programs; and
   providing NE structures representative of the recognized NEs to a linguistic analysis component.

2. The method of claim 1 wherein providing NE structures comprises:
   normalizing the NE structures to a normalized form.

3. The method of claim 2 wherein the textual input comprises an input string and further comprising:
   preprocessing the input string to obtain a set of tokens corresponding to the input string.

4. The method of claim 3 wherein normalizing comprises:
   identifying a span of tokens covered by each of the NE structures.

5. The method of claim 4 wherein providing NE structures comprises:
   identifying NE structures that cover a same span of tokens in the input string.

6. The method of claim 5 wherein providing NE structures comprises:
   merging the identified NE structures into a single syntactic structure.

7. The method of claim 1 and further comprising:
   providing the textual representation to a linguistic recognition component to identify NEs in the textual input in addition to those received from the interface.

8. The method of claim 7 and further comprising:
   receiving NE lexicons or NE grammars from the application programs, accessible by the linguistic recognition component.

9. The method of claim 8 wherein the linguistic recognition component recognizes NEs in the textual input by accessing the NE lexicons or NE grammars.

10. The method of claim 9 wherein providing NE structures comprises:
    preprocessing the textual input to obtain a set of tokens corresponding to the textual input;
    normalizing the NE structures to a normalized form by identifying a span of tokens covered by each of the NE structures;
    identifying NE structures that cover a same span of tokens in the textual input; and
    merging the identified NE structures into a single syntactic structure.

11. A linguistic analysis system receiving a plurality of textual inputs and providing an output, comprising:
    an interface exposing each of the textual inputs to a plurality of external named entity (NE) recognizers each associated with an application program; and
    an NE structure generator generating NE structures representative of recognized NEs, recognized by the external NE recognizers.

12. The linguistic analysis system of claim 11 and further comprising:
a linguistic layer recognition component configured to receive the textual input and recognize NEs in addition to the NEs recognized by the external NE recognizers.

13. The linguistic analysis system of claim 12 wherein the linguistic layer recognition component is configured to receive at least one of NE lexicons and NE grammars from the application programs and recognize NEs by accessing the NE grammars and NE lexicons.

14. The linguistic analysis system of claim 12 wherein the NE structure generator comprises:
a normalizing component configured to normalize the recognized NEs to a normalized form.

15. The linguistic analysis system of claim 14 wherein the textual input comprises an input string and further comprising:
a preprocessing component configured to preprocess the input string to obtain a set of tokens corresponding to the input string.

16. The linguistic analysis system of claim 15 wherein the normalizing component comprises:
a merging component identifying a span of tokens covered by each of the NE structures.

17. The linguistic analysis system of claim 16 wherein the merging component is further configured to identifying NE structures that cover a same span of tokens in the input string.

18. The linguistic analysis component of claim 17 wherein the merging component is configured to merge the identified NE structures into a single syntactic structure.

19. The linguistic analysis system of claim 11 wherein each external NE recognizer is associated with an application program and wherein the interface comprises:
an application programming interface which, when invoked, exposes a textual input to the external NE recognizers and receives the recognized NEs from the external recognizers along with indications of the application programs associated with each external NE recognizer that recognized a NE.

20. A linguistic analysis system providing a textual input to a plurality of named entity (NE) recognizers, each NE recognizer being associated with an application program and identifying NEs in the textual input, the linguistic analysis system providing a data structure indicative of each of the identified NEs, the data structure comprising:
an application identifier portion identifying the application associated with the NE recognizer that recognized the NE;
a semantic type portion identifying a semantic type of the recognized NE; and
a span portion indicative of a span of the textual input covered by the recognized NE.

21. The linguistic analysis system of claim 20 wherein the data structure further comprises:
a NE identifier portion identifying the recognized NE.

22. The linguistic analysis system of claim 21 wherein the data structure further comprises:
a syntactic portion identifying a syntactic type of the recognized NE.

23. The linguistic analysis system of claim 21 wherein the data structure further comprises:
an attributes portion identifying a data structure comprising the recognized NE.

24. The linguistic analysis system of claim 23 wherein the data structure further comprises:
an NE string portion identifying a string of the recognized NE.

25. The linguistic analysis system of claim 23 wherein the span portion comprises:
a first token identifier identifying the first token in the input string covered by the recognized NE.

26. The linguistic analysis system of claim 25 wherein the span portion comprises:
an ending token identifier identifying an ending token in the input string covered by the recognized NE.

* * * * *